(12) United States Patent
Phillips (10) Patent No.: US 7,665,744 B1
(45) Date of Patent: Feb. 23, 2010

(54) REVERSE DRIVE FOR A MOTORCYCLE

(76) Inventor: William A. Phillips, 5075 Wilson View Dr., Archdale, NC (US) 27263

( * ) Notice: Subject to any disclaimer, the term of this patent is extended or adjusted under 35 U.S.C. 154(b) by 163 days.

(21) Appl. No.: 11/773,114

(22) Filed: Jul. 3, 2007

Related U.S. Application Data (60) Provisional application No. 60/818,250, filed on Jul. 3, 2006.

(51) Int. Cl.
*B62B 5/00* (2006.01)

(52) U.S. Cl. .................................. 280/79.4; 280/79.11

(58) Field of Classification Search .............. 180/65.1, 180/65.31, 221, 342, 907; 280/79.4, 641, 280/43.16, 79.11, 47.34; 414/428, 429, 430
See application file for complete search history.

(56) References Cited

U.S. PATENT DOCUMENTS

| | | | | | |
|---|---|---|---|---|---|
| 1,275,716 | A | * | 8/1918 | Maurer, Jr. | 414/429 |
| 2,198,438 | A | * | 4/1940 | Knapp | 414/430 |
| 2,358,864 | A | * | 9/1944 | Lockwood | 414/430 |
| 2,573,728 | A | * | 11/1951 | Pugh, Sr. | 414/430 |
| 3,841,428 | A | * | 10/1974 | Bialek | 180/65.1 |
| 4,696,484 | A | * | 9/1987 | Casey | 280/43.16 |
| 4,784,402 | A | * | 11/1988 | Roman | 280/79.4 |
| 4,802,594 | A | * | 2/1989 | Graber | 280/79.4 |
| 4,974,695 | A | * | 12/1990 | Politte | 180/221 |
| 4,976,449 | A | * | 12/1990 | Lotspeich et al. | 280/79.4 |
| 5,039,123 | A | * | 8/1991 | Smeitink | 280/641 |
| 5,044,645 | A | * | 9/1991 | Eltvik | 280/79.4 |
| 5,049,025 | A | * | 9/1991 | Roman | 414/429 |
| 5,112,070 | A | * | 5/1992 | Hahn | 280/79.4 |
| 5,423,393 | A | * | 6/1995 | Felt | 180/221 |
| 5,456,348 | A | * | 10/1995 | Whetsel et al. | 198/812 |
| 6,065,557 | A | * | 5/2000 | von Keyserling | 180/221 |
| 6,179,542 | B1 | * | 1/2001 | Haven | 414/428 |
| 6,588,568 | B1 | * | 7/2003 | Flippo | 193/35 TE |
| 6,851,539 | B2 | * | 2/2005 | Flippo et al. | 193/35 TE |
| 7,097,406 | B1 | * | 8/2006 | Gang | 414/429 |
| 7,232,138 | B2 | * | 6/2007 | Shubert | 280/79.4 |
| 2003/0038437 | A1 | | 2/2003 | Ungvari | 280/79.4 |

* cited by examiner

*Primary Examiner*—Hau V Phan
(74) *Attorney, Agent, or Firm*—MacCord Mason PLLC (57) ABSTRACT

A reverse drive for a motorcycle. In one embodiment, the drive includes a flexible frame. A plurality of rollers are mounted to the flexible frame and configured to be positioned substantially horizontally. A motorcycle-interface is attached to the frame.

1 Claim, 8 Drawing Sheets

REVERSE DRIVE FOR A MOTORCYCLE

RELATED APPLICATIONS

The present invention claims priority to U.S. Provisional Application No. 60/818,250 filed Jul. 3, 2006.

BACKGROUND (1) Field

The present invention relates generally to reverse drives for motorcycles and, more particularly, to portable or removable or after-market devices that allow motorcycles to drive in reverse.

(2) Related Technology

Motorcycle transmissions having a reverse gear are known in the art. Most commonly, however, both new and old motorcycles lack reverse gears. To reverse motorcycles lacking a reverse gear, the rider must walk the motorcycle backwards. This can be very difficult, even dangerous, if the motorcycle is too heavy to for a particular rider to push or if the motorcycle needs to be reversed uphill. Others have recognized the problem.

Figure 1A:
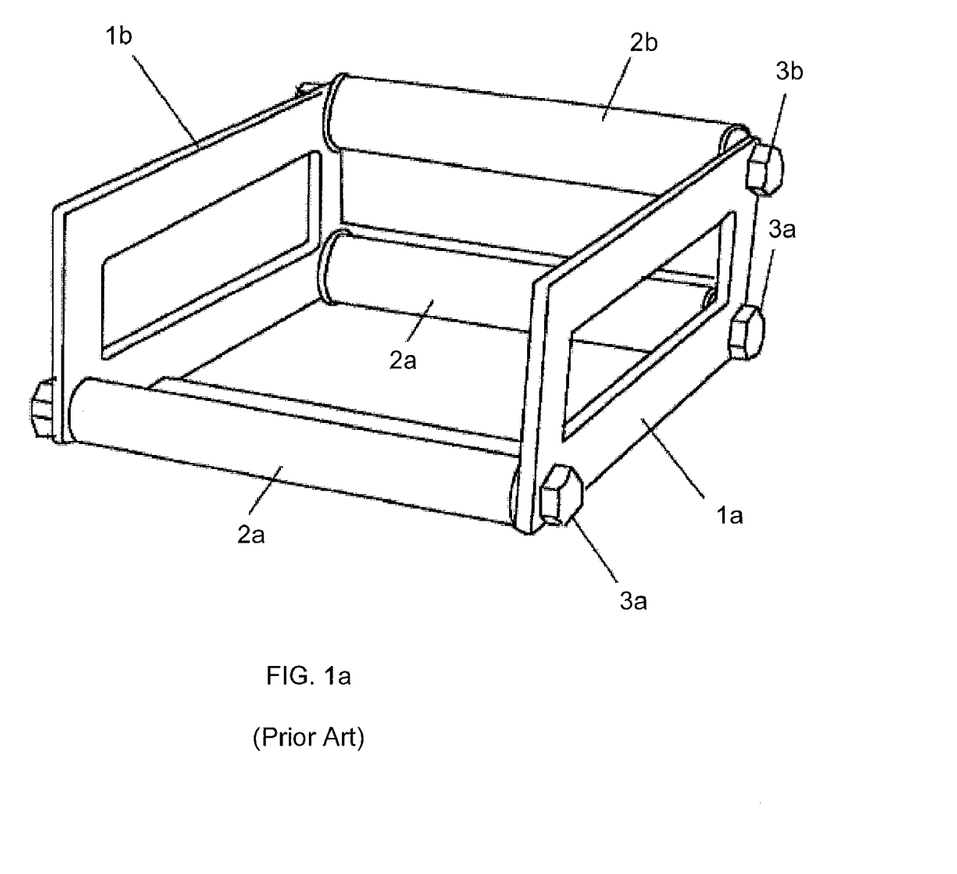
FIGS. 1a and 1b show a superficially related reverse drive.

United States Patent Application Publication 2003/0038437 ("Ungvari") discloses a portable reverse drive shown in FIG. 1a. Ungvari's drive includes a rigid frame having a lower frame portion 1a and an upper frame portion 1b. Attached to lower frame portion 1a, is a pair of lower rollers 2a mounted on lower axles 3a and secured by lower axle nuts 4a. Attached to upper frame portion 1b is an upper roller 2b mounted on an upper axle 3b.

Figure 1B:
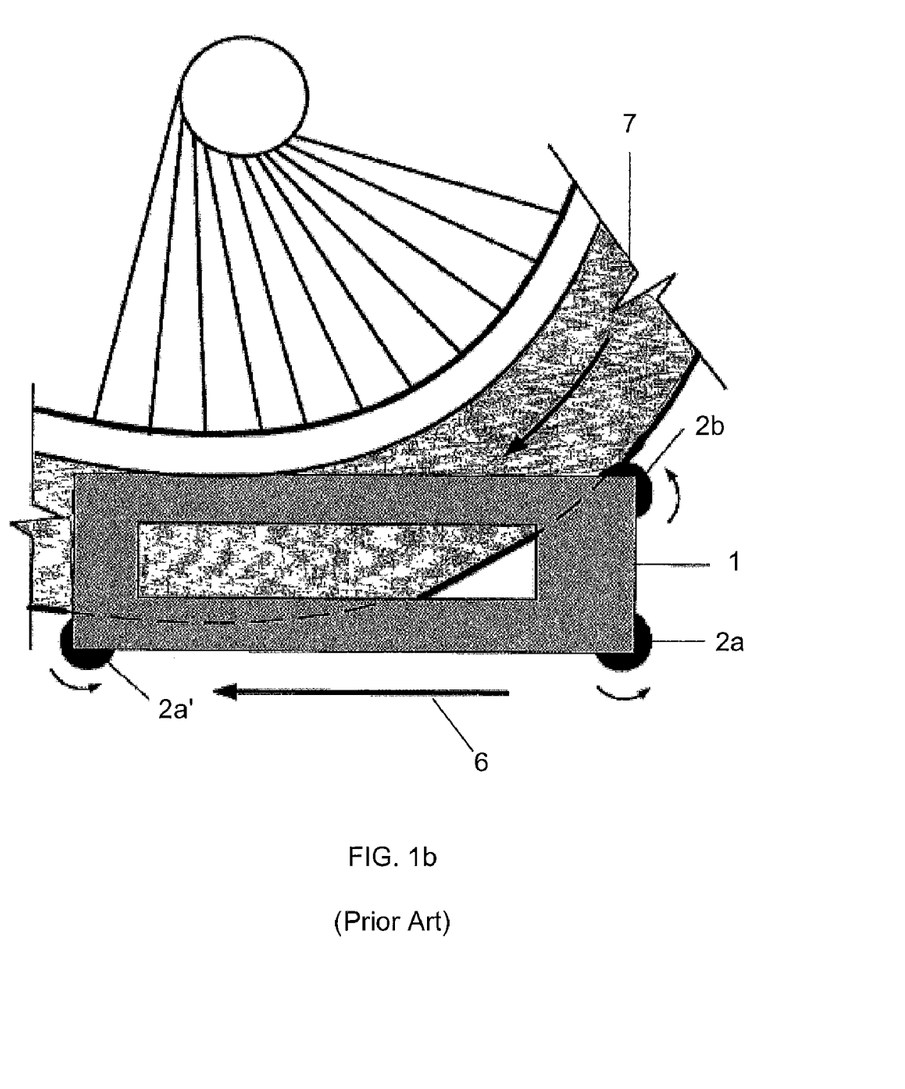

FIG. 2 shows Ungvari's drive in use. The drive is placed in front of the rear wheel 7 of a motorcycle. The rider then drives forward, first up onto the drive, and then as power is transmitted to Ungvari's roller 2a', the motorcycle is propelled backward 6 to the desired location. To get off the drive, the rider disengages the clutch, or shifts the motorcycle into neutral, and rolls backward. Ungvari's upper roller 2b is located toward the front of wheel 7 and is used to keep the motorcycle from advancing forward off the drive or to keep the motorcycle from advancing the drive out from under wheel 7. As a result of this configuration, Ungvari needs a rigid frame 1 to hold roller 2b at the desired height and distance relative to wheel 7. Applicant has discovered various problems with this technique. For example, Ungvari's solution of using upper roller 2b to prevent rearward movement of the drive necessitates a rigid upper frame to hold the upper roller at the desired height relative to wheel 7 and necessitates a rigid lower frame to prevent the forward movement of roller 2b relative to the lower frame. Further, Ungvari's drive only provides a reverse drive force through a single roller, the rearmost lower roller 2a'. Applicant's invention addresses these and additional problems.

SUMMARY

The present invention includes a reverse drive for a motorcycle. In one embodiment, the drive includes a flexible frame. A plurality of rollers are mounted to the flexible frame and configured to be positioned substantially horizontally. A motorcycle-interface is attached to the frame.

In another embodiment, the flexible frame has a pair of sides, each of which is made of a plurality of substantially flat body-links. Body-links define at least one aperture substantially distally placed along the length of the body-link. A plurality of substantially rigid, substantially v-shaped rollers are mounted through overlapping apertures of body-links. Rollers are positioned in between and substantially perpendicularly to the sides of the frame and are substantially parallel to each other and separated by a distance of about 0.25 to about 2 inches. While the size of rollers may vary, they are preferably sized to engage, e.g., frictionally, the wheel of a motorcycle. A motorcycle-interface is attached to the frame of the drive by a flexible connection, e.g., a rope or cord, and is configured to attach to a portion of a motorcycle, e.g., a bottom portion of the motorcycle's frame.

In another embodiment, the roller drive is powered.

In another embodiment, the roller drive is extractably and retractably stored within a frame-mount positioned on the motorcycle.

The above summary was intended to summarize certain embodiments of the present invention. These and other embodiments of the invention will be set forth in more detail, along with discussions of their use, in the figures and detailed description below. It will be apparent, however, that the detailed description is not intended to limit the present invention, the scope of which should be properly determined by the appended claims.

DESCRIPTION OF THE PREFERRED EMBODIMENTS

Figure 2A:
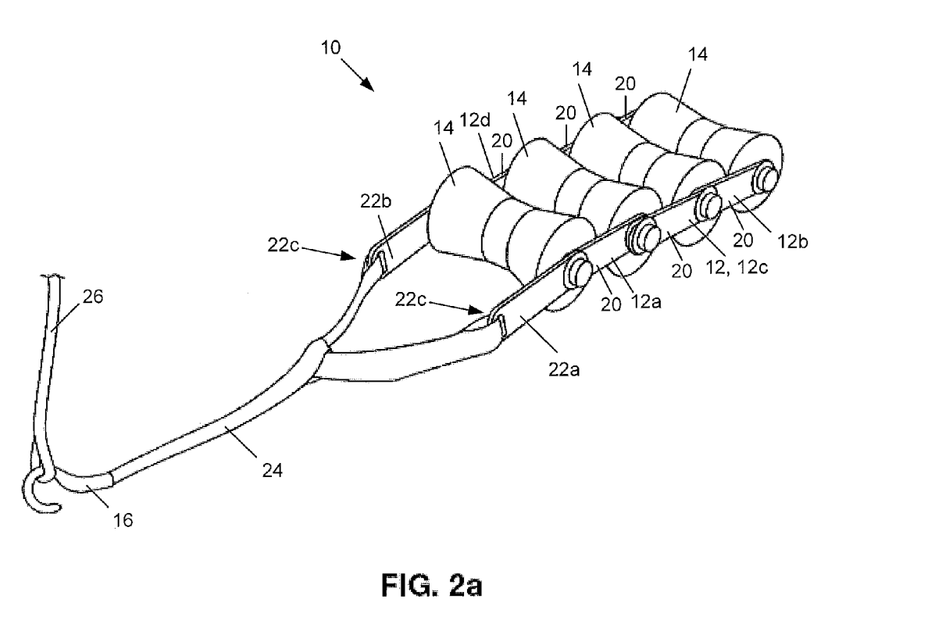
FIGS. 2a, 2b, and 2c show one embodiment of a reverse drive of the present invention.
Figure 2B:
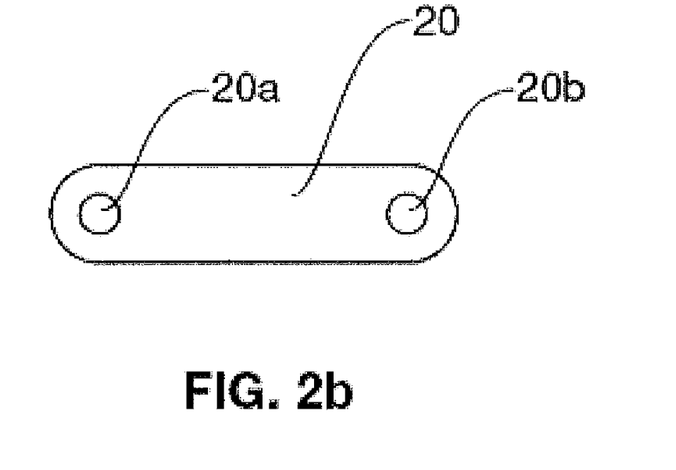
Figure 2C:
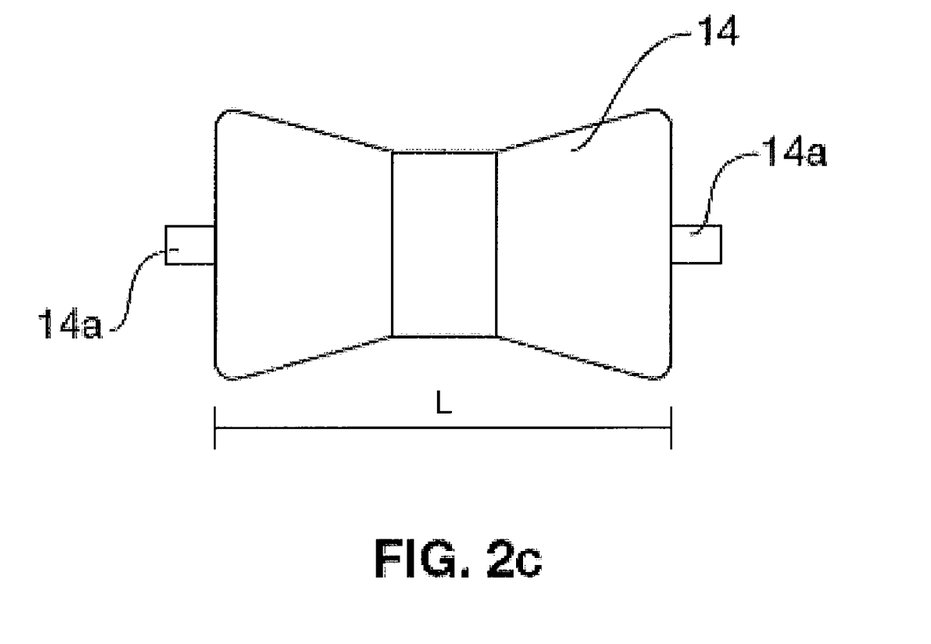

FIG. 2a shows one embodiment of a reverse drive 10 of the present invention. FIG. 2b shows a close-up, isolated view of a link shown in FIG. 2a. FIG. 2c shows a close-up, isolated view of a roller shown in FIG. 2a.

Referring to FIGS. 2a, 2b, and 2c generally, Drive 10 includes a flexible frame 12, which may be considered to have a front portion 12a and a back portion 12b. A plurality of rollers 14 are mounted to said flexible frame 12 and configured to positioned substantially horizontally, e.g., laid flat on the ground or a road. A motorcycle-interface 16 is also attached frame 12.

Frame 12 includes a plurality of body-links 20. Links 20 are preferably substantially flat and substantially rigid, e.g., stamped steel, and define a front aperture 20a and rear aperture 20b, which are substantially distally positioned and substantially circular. Rollers 14 are mounted to links 20 of frame 12 by inserting rod 14a of roller 14 into the overlapped apertures of two body-links 20 and rotatably securing therein. Rod 14a of roller 14 also function as a pivot, about which links pivot, thereby establishing flexibility. Others may achieve flexibility in other ways, for example with ball and socket types of linkage, etc., and those embodiments are also considered to be within the scope of the present invention. The flexibility of the present invention is beneficial in that it allows the reverse drive 10 to be easily folded and conformed for storing on the motorcycle where storage is at a premium, yet opened such that all of the frame is capable of being positioned substantially horizontally, e.g., along the floor. In addition, it allows reverse drive 10 to operate with predictable success on a variety of rough terrains, including gravel or unpaved roads or shoulders for example, as the rollers are capable of sufficiently conforming to the terrain.

In a preferred embodiment, as shown, frame 12 includes a pair of sides, e.g. a first side 12c and a second side 12d, which are arranged in a substantially parallel position, each including a plurality of body-links 20. Even more preferably, the sides are essentially to completely parallel, but others may prefer to use sides that are non-parallel, and those embodiments are also inclusive of the present invention. In embodiments, such as the one shown, having two sided frames, rollers 14 will preferably be mounted in between frames, e.g., in between frame 12c and 12d. Preferably rollers 14 are substantially perpendicular to sides of the frame, e.g., to 12c or 12d, and are preferably substantially parallel to each other. Other embodiments of the present invention may be practiced with only a single-sided frame for example, by removing either side 12c or 12d. In this type of embodiment, for example, rollers may be mounted on cantilevered rods, with the end of the rod distal from frame 12 including a stop, e.g., a bolt, to prevent rollers from sliding off the rod.

In addition to the plurality of body-links 20, frame 12 includes at least one motorcycle-interface link, e.g., 22a or 22b. Preferably, frame 12 includes both links 22a and 22b, which are configured allow attachment to motorcycle-interface 16. Motorcycle-interface link 22 may be different links than body-links 20 or may be substantially similar to essentially the same as body-link 20. Applicant prefers to use a motorcycle-interface link 22 similar to body-link 20, however, applicant prefers to define the front aperture by a substantially D-shape 22c. The rear aperture of motorcycle-interface link 22 is similar to apertures of body-links 20, thereby allowing the overlapped apertures of motorcycle-interface link and body-link to be connected through rod 14a. Others may use other motorcycle-interfaces, e.g., by simply connecting to another part of the frame or a part of the roller, e.g., bar 14a, and such variations are considered to be within the scope of the invention.

A flexible connection 24 is connected to motorcycle interface 16 at one end and to motorcycle-interface link 22a and 22b at the opposite end. Flexible connection 24 may be anything suitable to connect to interface 16 to frame 12 provided it has some degree of flexibility and sufficient tensile strength to adequately perform. Applicant prefers, for the embodiment shown in FIG. 2a, nylon webbing straps of approximately about a quarter inch to one inch in width. In other embodiments, flexible connection 24 may be rope, webbing, strap, chain, cord, wire, etc., or any combination thereof.

Referring to rollers 14 in more detail, it can be seen that they are substantially v-shaped. As seen, the v-shaped roller 14 of FIG. 2c may be considered to have a cross-sectional circumference that decreases medially. Applicant prefers v-shaped rollers because Applicant believes they facilitate wheel placement, but others may prefer to practice the invention with substantially cylindrical rollers, and such embodiments are also within the scope of the present invention. The ranges of roller diameter may vary, yet applicant prefers to employ rollers having a diameter at the widest part of the roller of between about 0.2 inches to about 3 inches, more preferably, about 0.5 inches to about 1.5 inches. Rollers 14 are sized to engage a motor cycle wheel, for example, they may have a length L of about 3 inches to about 12 inches, making preferred widths of the frame about 3 inches to about 16 inches. More preferably, rollers have a length of about 5 inches to about 12 inches. Within frame 12, rollers 14 are spaced about 0.1 inches to 3 inches apart, more preferably, about 0.25 inches to about 1 inch apart. Others may prefer other spacing and roller sizes which are also considered to be within the scope of the present invention. Although FIG. 2a shows four rollers 14, other embodiments including more or less rollers are also considered to be within the scope of the present invention. For example, some may achieve the invention with 2, 3, 4, 5, 6, 7, 8, 9, 10, 11, 12, 13, 14, 15, etc., rollers with the number depending to a certain extent on the desired diameter of the roller. Applicant prefers between about 3 and 8 rollers.

Rollers 14 are substantially rigid. Applicant prefers to construct rollers from rubber, particularly hard rubber, e.g., vulcanized rubber. Others may prefer plastics, woods, metals, ceramics, etc; still others may prefer to use pressurized, inflatable rollers, all variations of which are considered to be within the scope of the present invention. Motorcycle interface 16 is configured to attach to a portion of the motorcycle, preferably in between the motorcycle's front and rear wheel. In the embodiment shown in FIG. 2a, interface 16 is a hook configured to attach to a bottom portion of the motorcycle's frame, for example, a crossbar positioned across the bottom of the motorcycle's frame. In other embodiments, hook 16 may attach to other portions of the motorcycle. Further, some may wish to add additional structure to the motorcycle, e.g., a loop, hook, cleat, flange, etc., that is configured to be engaged by hook 16. All such embodiments are within the scope of the present invention. While hook 16 size may vary, Applicant prefers to use a diameter of about 0.25 inches to about 1 inch.

Drive 10 may also include, in many embodiments, pick-up strap 26. Pick-up strap 26 has a length and positioning on the drive sufficient to allow a rider positioned on top of a motorcycle to retrieve drive 10 placed on the ground. For example, using strap 26 a user may retrieve drive 10 after reversing has been achieved. Preferably strap 26 will be attached near motorcycle-interface 16 in such a way that a rider positioned on the motorcycle can disengage interface 16 from the motorcycle and retrieve drive 10 without getting off the motorcycle. For example, with the embodiment shown in FIG. 2a, a rider can pull forward on strap 26, thereby disengaging hook 16 from the motorcycle. The driver can then retrieve drive 10. Strap 26 may be constructed from rope, webbing, strap, chain, cord, wire, etc., or any combination thereof.

Figure 3:
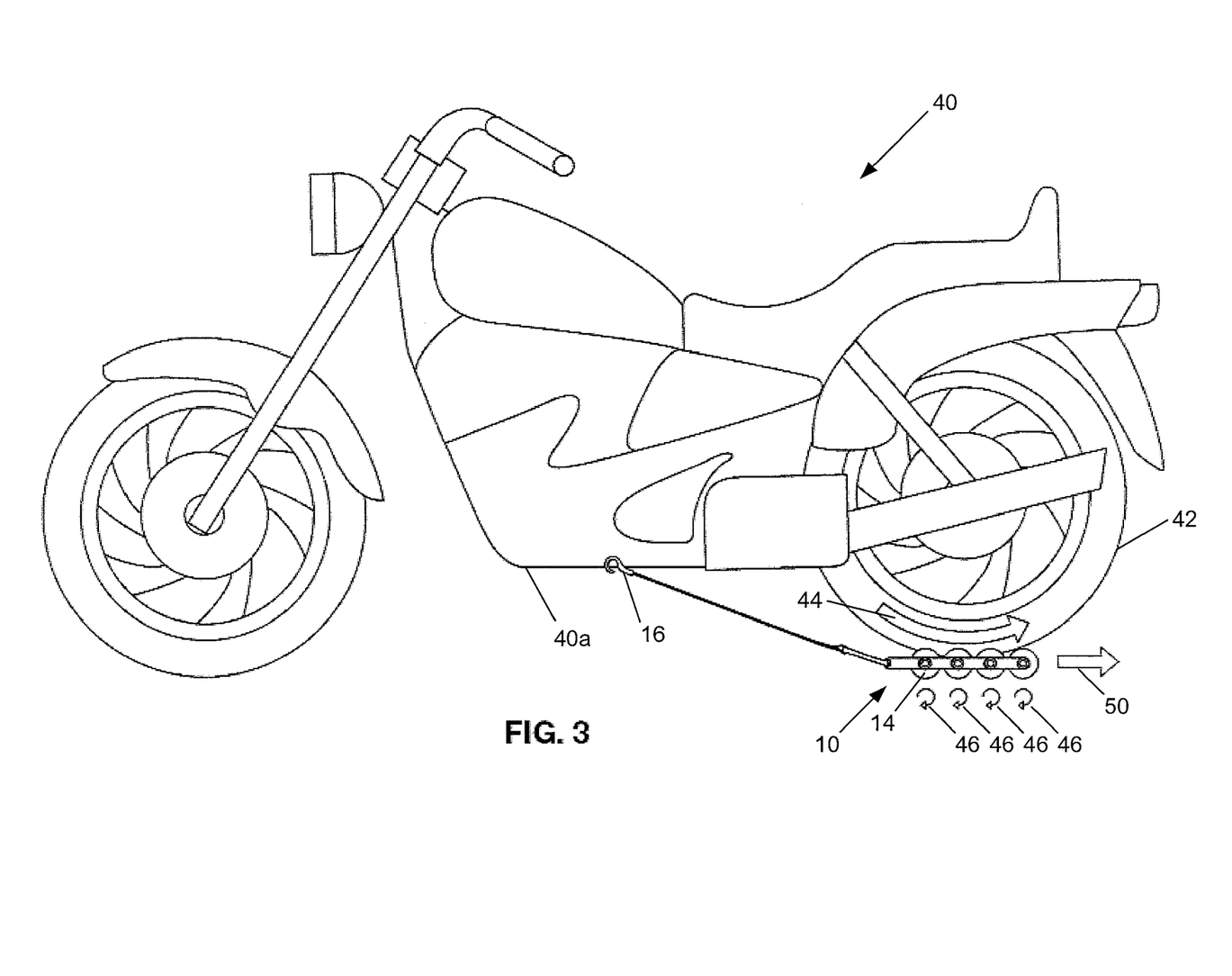
FIG. 3 illustrates the drive shown in FIG. 2a being used by a motorcycle to reverse.

FIG. 3 shows motorcycle 40 using reverse drive 10. Motorcycle-interface 16 of reverse drive 10 is connected to frame 40a of motorcycle 40 having a rear wheel 42. Rollers 14 of drive 10 are in frictional contact with rear wheel 42. When a drive gear (not shown) of motorcycle 40 is employed, rear wheel 42 rotates forward in the direction indicated by arrow 44. The forward rotation 44 of wheel 42 creates a rearward rotation indicated by arrow 46, in rollers 14 through the frictional contact between rear wheel 42 and rollers 14. The rearward rotation 46 results in a rearward, or reverse, movement 50 of drive 10 and motorcycle 40. Motorcycle interface 16 prevents drive 10 from moving rearwardly out from under wheel 42. When motorcycle 40 has been reversed the desired distance, the motorcycle's drive gear can be disengaged, and motorcycle 40 can be rolled forward off drive 10, or drive 10 can be pulled forward out from under wheel 42.

Figure 4A:
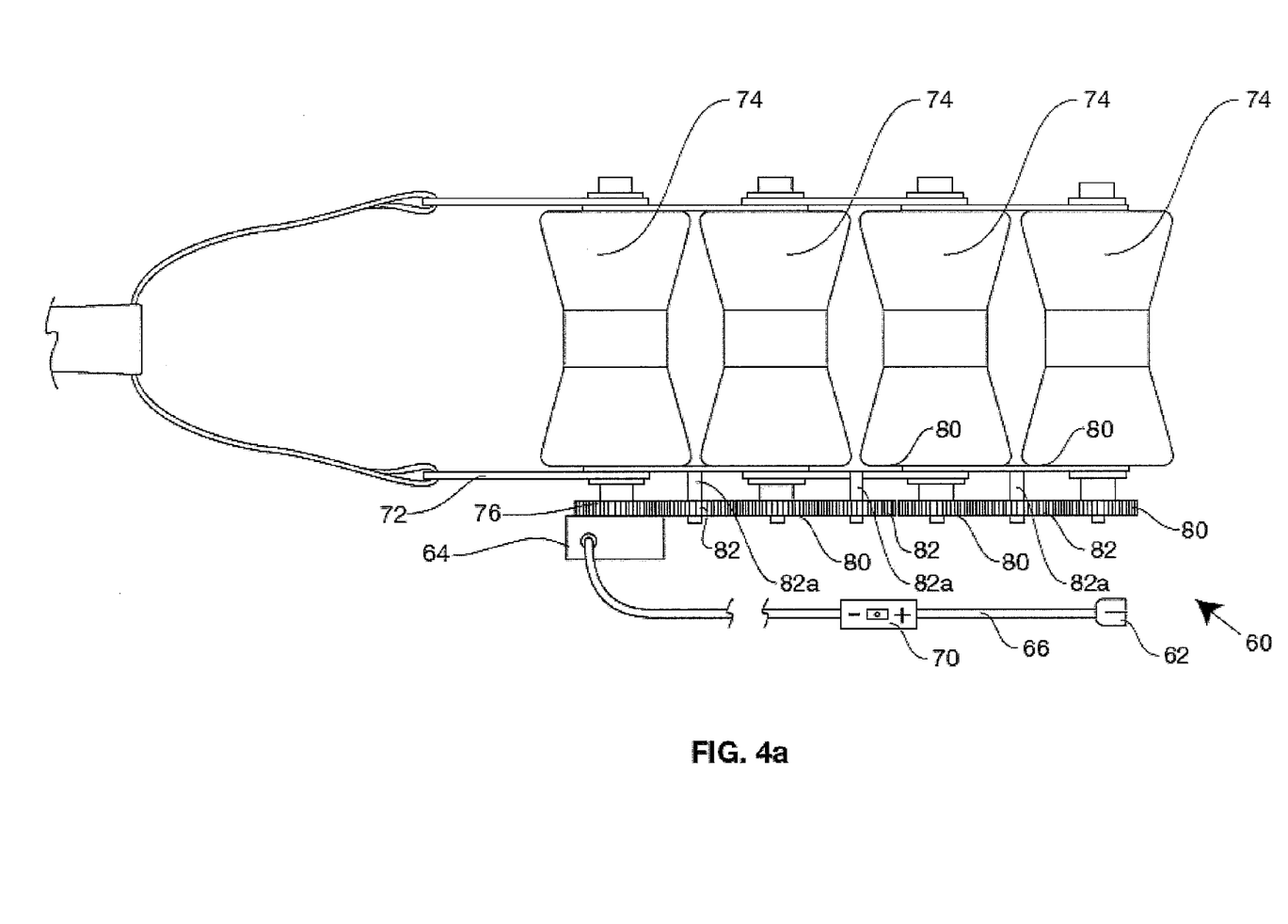
FIG. 4 shows another embodiment of the present invention.

FIG. 4a shows another embodiment 60 of the present invention which includes the basic components of embodiments described relating to FIGS. 2a, 2b, and 2c. In addition, the drive 60 includes power interface 62 connected to motor 64 by cable 66. Power interface 62 is configured to interface with a power source, such as, a motorcycles internal power source, and may be a plug for a motorcycle's cigarette lighter. In addition, the power source may be an auxiliary power source, such as a power source provided specifically for reverse drive 60, or for other purposes. Preferably, drive 60 also includes switch 70 positioned upstream of motor 64 along the length of cable 66, preferably proximal to power interface 62 to facilitate easy access by riders. Switch 70 is configured to selectively provide power to motor 64. Preferably switch 70 is also capable of switching polarity, thereby allowing drive 60 to move in the rearward direction to reverse the motorcycle, and to allow drive 60 to move in the forward direction to move out from under the rear wheel of the motorcycle.

Motor 64 is preferably positioned on frame 72 of drive 60, and is even more preferably forwardly positioned on frame 72 thereby reducing the risk of motor 64 being damaged by the rear wheel of the motorcycle. Motor 64 is also positioned in drive communication with at least one of rollers 74, even more preferably with at least two or more of rollers 74. In preferred embodiments, a gear drive 76 of motor 64 engages a gear suitable to drive rollers, e.g. a roller-gear 80 or a non-roller gear 82. Roller-gears 80 are preferably coaxially mounted on rollers 74 and configured to transfer rotation force to rollers 74. Non-roller gears are preferably rotationally mounted through axle 82a to frame 72. The transfer of rotational force from gear drive 76 is sufficient to drives rollers 74.

Figure 4B:
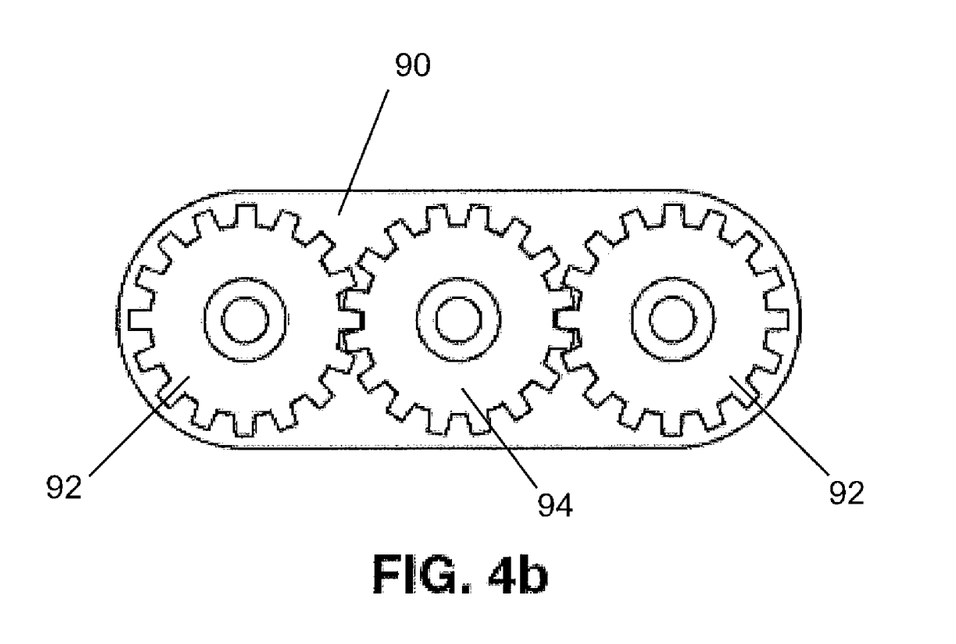

In preferred embodiments, roller-gears 80 are in rotational communication with each other, whereby the rotation of one roller-gear 80 rotates another roller-gear 80. Applicant prefers to achieve this rotational communication with at least one non-roller gear 82 positioned substantially adjacent to and in between at least two roller-gears. In preferred embodiments, non-roller gears 82 will be positioned in between each pair of roller-gears 80, thereby allowing all rollers of drive 60 to be powered by motor 64. As shown in FIG. 4a, gear drive 76 and gears 80 and 82 are positioned on the outside of frame 72. In other embodiments, gear drives, roller gears, and non-roller gears may be positioned in between rollers and links, thereby reducing the chance of gear snag and gear fouling, and many may consider this configuration to be a preferred embodiment. For example, FIG. 4b shows link 90 having roller-gears 92 (rollers not shown) in rotational communication by non-roller gear 94. Gears 92 and 94 could be inwardly facing to achieve the abovementioned embodiment. While applicant prefers to use cogged gears to transfer rotational force, others may prefer other methods, e.g., belts, which are also considered to be within the scope of the present invention.

Figure 5A:
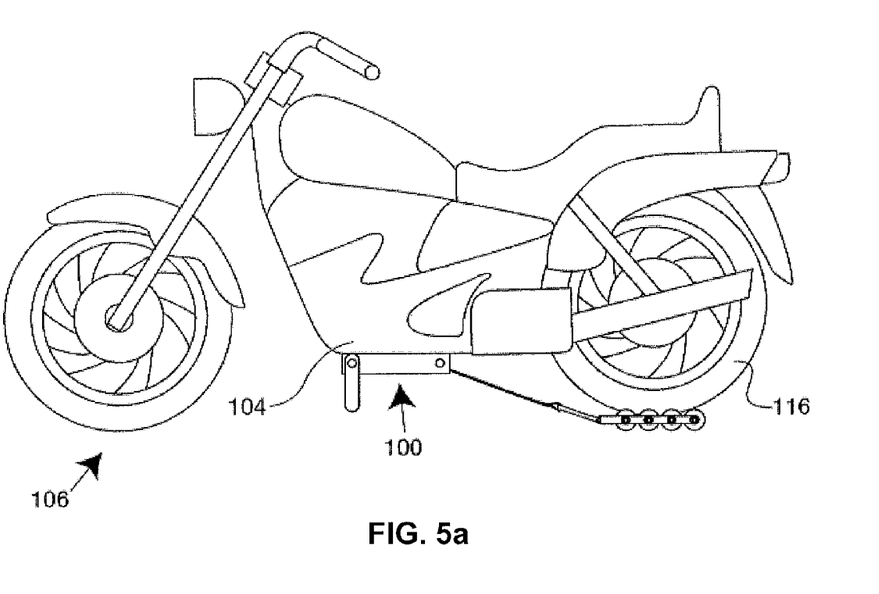
FIGS. 5a and 5b show another embodiment of the present invention.
Figure 5B:
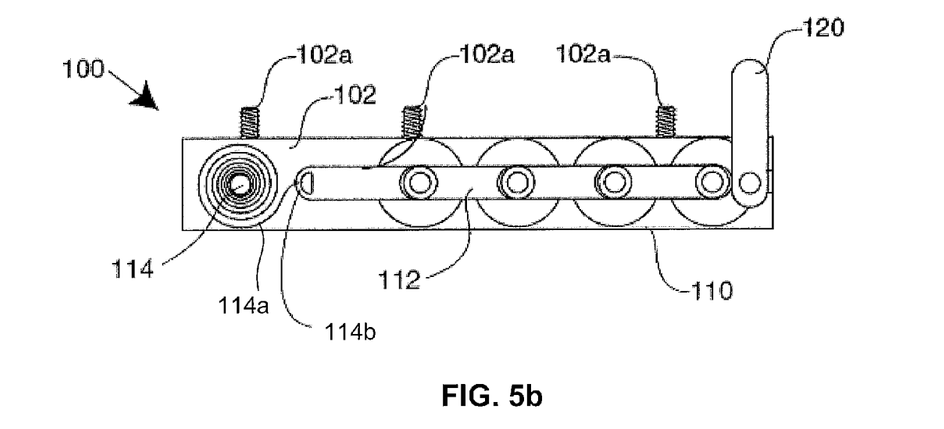

FIGS. 5a and 5b show another embodiment 100 of the present invention. Referring generally to both 5a and 5b in this embodiment, motorcycle-interface includes a frame-mount 102 configured to be fixedly mounted to the frame 104 of motorcycle 106. Mounting may be achieved, for example, by bolting or welding arms 102a of frame-mount 102 to frame 104. Others may prefer to fixedly mount in other ways, all of which are considered to be within the scope of the present invention.

Frame-mount 102 includes plate 110, which is substantially horizontally oriented and configured to releasably retain the frame 112 of drive 100. Frame-mount 102 also includes drive-retractor 114 fixedly mounted to frame-mount 102 toward the front of frame-mount 102. Drive-retractor 114 includes a retracting line 114a connected at point 114b to frame 112 of drive 100, and is configured to allow frame 112 to extend out of frame-mount 102 to at least the distance of rear wheel 116. Drive-retractor 114 is preferably a spring loaded roller. Drive-retractor 114 is configured to retract frame 112 into frame-mount 102 when reverse drive 100 is not needed. To facilitate removal of frame 112 from frame-mount 102, push 120 is attached to frame 112. Push 120 is preferably substantially rearwardly positioned along the length of frame 112 and is configured to extend substantially distally and horizontally away from motorcycle 106. Push 120 allows a driver sitting on motorcycle 106 to extract frame 112 from frame-mount 102 by pushing down on push 102 with the foot. Although push 120 may be a fixedly mounted arm, flange, etc., Applicant prefers to configure push 120 using a spring (not shown) such that it is biased to a substantially vertical position when not in use, thereby reducing snag risk and being capable of moving to a substantially horizontally position at the application of sufficient pressure by the foot.

Applicant has employed various embodiments of the present invention and found them to be highly effective at reversing motorcycles.

Numerous characteristics and advantages have been set forth in the foregoing description, together with details of structure and function. The novel features are pointed out in the appended claims. The disclosure, however, is illustrative only, and changes may be made in detail, especially in matters of shape, size, and arrangement of parts, within the principle of the invention, to the full extent indicated by the broad general meaning of the terms in which the general claims are expressed.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein, and every number between the end points. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10, as well as all ranges beginning and ending within the end points, e.g. 2 to 9, 3 to 8, 3 to 9, 4 to 7, and finally to each number 1, 2, 3, 4, 5, 6, 7, 8, 9 and 10 contained within the range. Additionally, any reference referred to as being "incorporated herein" is to be understood as being incorporated in its entirety. It is further noted that, as used in this specification, the singular forms "a," "an," and "the" include plural referents unless expressly and unequivocally limited to one referent.

I claim:

1. A reverse drive for a motorcycle, said drive comprising:
   a flexible frame having a pair of sides, each of said sides including a plurality of substantially flat body-links having a length and defining at least one aperture substantially distally placed along said length of said body-link;
   a plurality of substantially rigid substantially v-shaped rollers, wherein said rollers are sized to engage a motorcycle wheel,
      mounted through said at least one aperture of said plurality of body links,
      positioned in between and substantially perpendicularly to said sides of said flexible frame,
      substantially parallel to each other and separated by a distance of about 0.25 to about 2 inches, and
      all configured to be positioned substantially horizontally;
   a motorcycle-interface attached to said flexible frame and configured to attach to a portion of said motorcycle in between a front wheel of said motorcycle and a back wheel of said motorcycle; and
      a flexible connection connected to said motorcycle interface at one end and to said flexible frame at said opposite end.

* * * * *